June 3, 1941.  L. S. WILLIAMS  2,244,588
MEASURING DEVICE
Filed Nov. 16, 1939   2 Sheets-Sheet 1
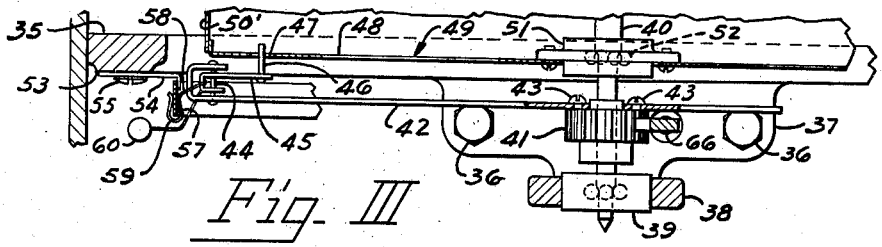
Fig. III
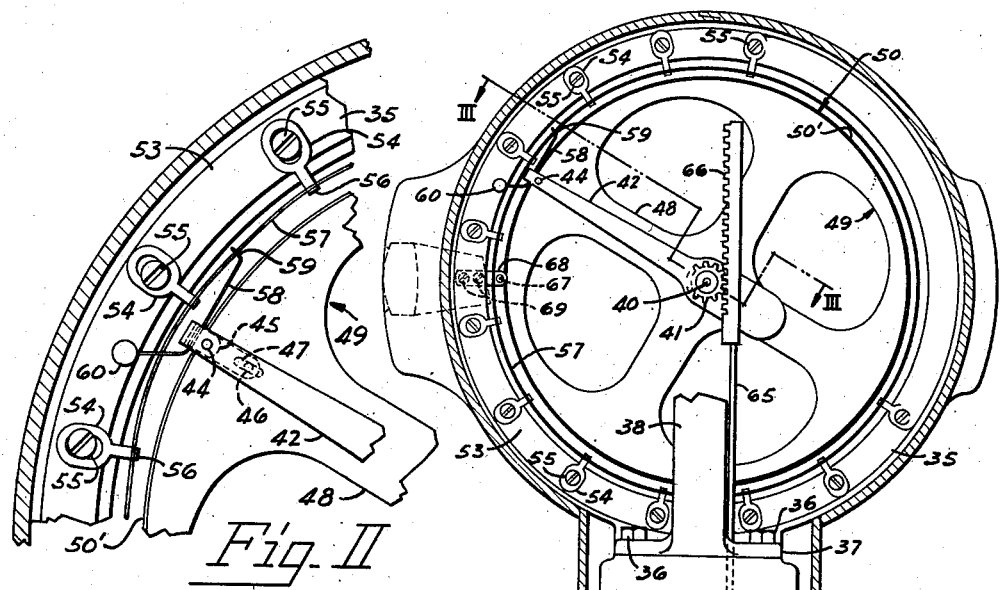
Fig. II
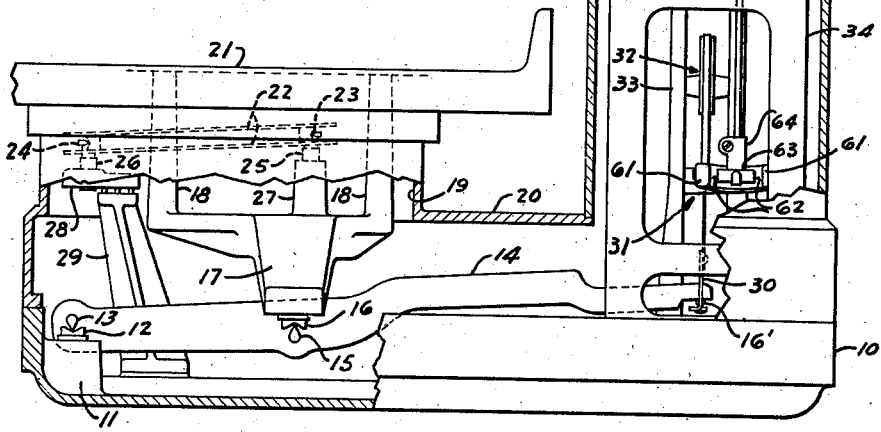
Fig. I
Lawrence S. Williams
INVENTOR
BY Marshall & Marshall
ATTORNEYS June 3, 1941.  L. S. WILLIAMS  2,244,588
MEASURING DEVICE
Filed Nov. 16, 1939  2 Sheets-Sheet 2
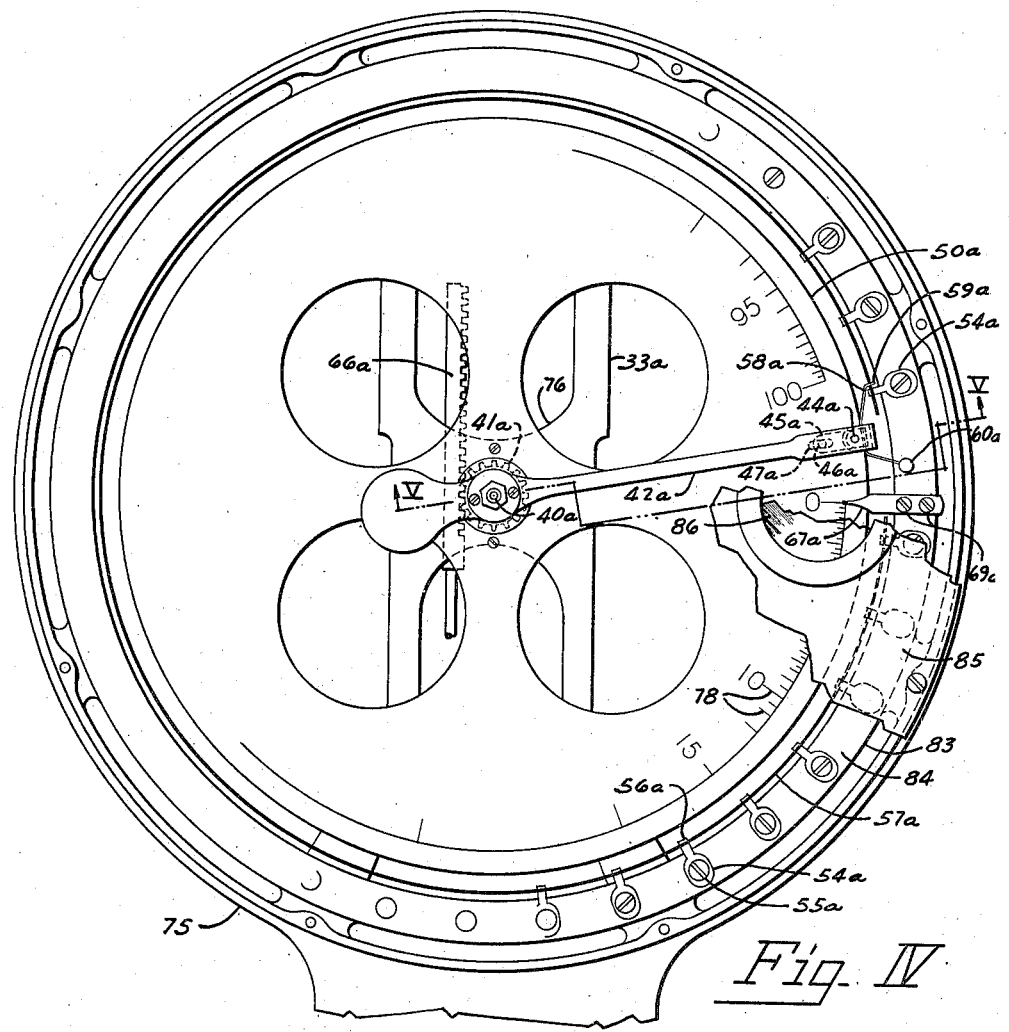
Fig. IV
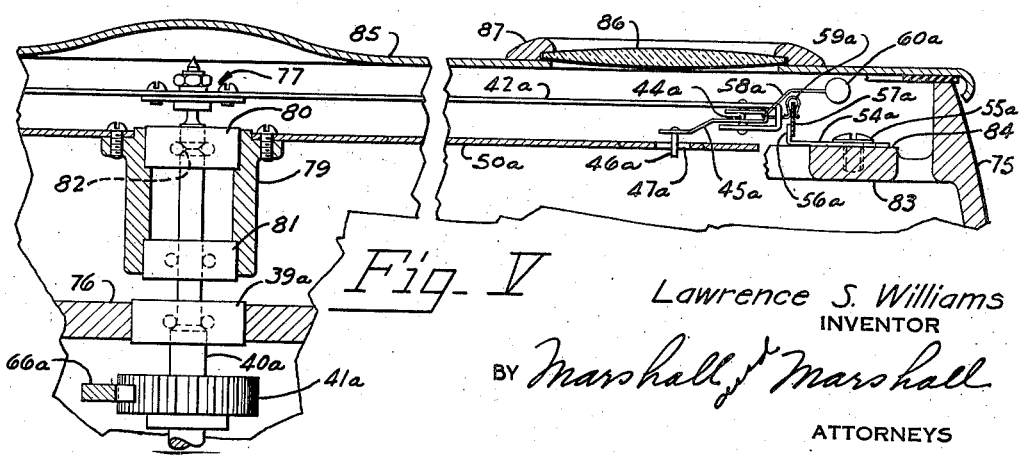
Fig. V
Lawrence S. Williams
INVENTOR
BY Marshall & Marshall
ATTORNEYS Patented June 3, 1941

2,244,588

UNITED STATES PATENT OFFICE 2,244,588

MEASURING DEVICE

Lawrence S. Williams, Toledo, Ohio, assignor to Toledo Scale Company, a corporation of New Jersey Application November 16, 1939, Serial No. 304,738

7 Claims. (Cl. 116—129)

This invention relates generally to measuring devices, and more particularly to indicating means of measuring devices, for example weighing scales, in which there is provided a rotatable indicating chart.

Indicating charts used in devices of this type are printed from very accurately graduated printing plates in an offset press which employs a transfer roller. These rollers are quite heavy and are covered by a rubber "blanket" which is firmly locked thereon.

In the printing operation this roller is first rolled over the inked printing plate and then over a platen upon which a sheet of paper or thin aluminum, enameled zinc or other material is resting. The ink from the roller is thus transferred to the sheet. The roller is constrained to move in a to and fro direction over the plate and over the printing sheet by means of teeth on the ends of the roller and racks at the sides of the bed of the press; however, the platens upon which the printing plate and the printing sheets are resting are adjustable to different thicknesses of paper or other printing sheets and an operator is very apt to adjust this platen so that there is more pressure on one corner than on the other. It also happens infrequently that these platens warp slightly in the center. When the roller passes over the printing plate or the printing sheet and it is not exactly adjusted and greater pressure is put on the rubber "blanket" in spots this excess pressure is apt to cause slight errors in the position of some of the graduations. These errors are very slight and are not apparent to the naked eye. They will, however, cause errors in the indication of the device which cannot be corrected by the customary mechanical adjustment since they are not due to characteristics of the instrument. Heretofore, if such an erroneous chart was discovered in a device it was necessary to disassemble the device and replace the chart.

The principal object of this invention is the provision of improved means for compensating for errors in the indication of a measuring device.

Another object is the provision of improved means for imparting corrective variations to the movement of a rotatable indicating chart.

Another object is the provision of improved means for actuating a rotating indicating chart; and, A still further object is the provision of improved means for controlling the chart actuating means by means of a deformable member.

These, and other objects and advantages will be apparent from the following description in which reference is had to the accompanying drawings, illustrating a preferred embodiment of the invention and wherein similar reference numerals refer to similar parts throughout the several views.

In the drawings:

Fig. I is a side elevational view of a device embodying the invention, portions thereof being broken away and others are shown sectioned.

Fig. II is an enlarged fragmentary view of the chart and of chart actuating and chart position determining means.

Fig. III is an enlarged fragmentary sectional view, the section being taken substantially along the line III—III of Fig. I.

Fig. IV is a front elevational view of a device embodying a modification of the invention, portions of casing parts being broken away; and, Fig. V is an enlarged sectional view as viewed from along the line V—V of Fig. IV.

Referring to the drawings in detail:

In these drawings and in the following description the indicating means according to the invention are shown embodied in a weighing scale. Since such indicating means may be employed in combination with many different types of scale mechanisms the ones herein shown and described are to be regarded as illustrative only and are described herein only to such extent as to fully disclose the invention.

The device comprises a rigid, pan-shaped cast base 10 having integral fulcrum stands 11 which support bearings 12 upon which are mounted, by means of knife edge fulcrum pivots 13, a load supporting lever 14. This lever is of the second order and is provided additionally with load pivots 15 and a nose or power pivot 16'. The load pivots 15, whose edges face upwardly, support bearings 16 in a load supporting spider 17. This load supporting spider is provided with a plurality of posts 18 extending upwardly through an opening 19 in a base casing 20 which rests upon the rim of the base 10 and houses the mechanism assembled thereon. The upper ends of the posts 18 support a platter 21 for the reception of loads to be weighed. The condition of level of this platform is maintained by a check link 22 extending between suitable opposed pivots 23 and 24 secured to posts 25 and 26 which are threaded respectively into a boss 27 integral with the spider 17 and into a plate 28 adjustably secured to a bracket 29 arising from the base 10.

The nose pivot 16' in the free end of the lever 14 engages a stirrup 30 which is operatively connected, through an intermediate lever 31, to a load counterbalancing pendulum 32. This load counterbalancing pendulum is supported and fulcrumed upon a pendulum stand 33 arising from the base 10.

Erected upon opposite corners of the base 10 are frames 34 and surmounting these frames are substantially circular casing spiders 35. These casing spiders are secured to the frames 34 by means of bolts 36 which pass through holes in laterally extending base portions 37. Ears 38, which arise from the base portions 37 and are spaced from the circular portions, carry ball bearings 39 which support the ends of a chart shaft 40.

To a pinion 41, pinned to the shaft 40 adjacent one of its ends, is fixedly secured a substantially flat chart actuating arm 42 by means of screws 43 which are threaded into the body of the pinion. The outer end of this arm is rebent to form a U-shaped terminal and a pintle 44 extends between the arms of this U. This pintle pivotally supports a chart position adjusting finger 45 having a laterally extending pin 46 which enters an elongated slot 47 in a radial arm 48 in one of a pair of chart spiders 49. These chart spiders form the end supports of a chart 50 comprising a cylinder 50' of light material, such as paper or thin aluminum, upon which indicia are printed or otherwise marked thereon.

It is usually customary in scales of this type to pin, or otherwise key, the cylindrical indicating chart rigidly to the chart shaft so that they function as an integral part. According to this invention however, each of the chart spiders 49 is provided centrally with a hub 51 in which a ball bearing 52 is seated and these ball bearings are positioned upon shoulders of the chart shaft 40 so that the cylindrical chart 50 may rotate upon the chart shaft 40, on the ball bearings 39, independently of the rotation of this shaft.

It will be observed in the drawings that the face of one of these casing spiders 35, adjacent its periphery, is provided with an annular machined pad 53 (Fig. III) to which is fastened a plurality of radially positioned angle clips 54, by means of screws 55 passing through elongated slots in the clips. To short projecting legs 56 extending perpendicularly to the body of the clips 54 is fastened, by riveting or preferably spot welding, a strip of flexible material 57 which as initially assembled is curved concentrically to the periphery of the chart 50.

For a purpose which will later become clear, the chart adusting finger 45 has an arm 58 rigidly secured to its rearwardly extending portion. This arm, preferably made from stiff music wire, is secured substantially at its center to the finger 45 and one of its ends terminates in an open-ended loop 59 which straddles the flexible strip 57. The other end of this arm, bent to a proper angle, carries a counterweight 60 which statically balances the assembly formed by the chart adjusting finger 45 and the arm 58 about the fulcrum of this assembly, that is the pintle 44.

The free end of the intermediate lever 31, previously referred to, terminates in a bifurcation and arms 61 formed thereby, by means of tenon screws 62, support a gimbal 63 to which a clamp 64 is secured. This clamp holds the lower end of a rod 65 carrying at its upper end a rack 66 whose teeth mesh with the teeth of the pinion 41.

When a load of known weight is placed upon the platter 21 the moment of this load deflects the lever 14 and its nose pivot 19', and through suitable means including the stirrup 30 and intermediate lever 31, transmits a proportional part of this moment to the pendulum which automatically acts to counterbalance it in the usual manner. Since the deflection, that is the substantially vertical movement of the end of the lever 31, which carries the gimbal 63, is a function of the weight of the load on the platter and since this deflection is directly transmitted through the rack 66 to the pinion 41 the chart actuating arm 42 is rotated through an angle which is also a function of the weight of the load.

The chart position adjusting finger 45, which is mounted on the arm 42, partakes of this movement and through its laterally extending pin 46, projecting into the elongated slot in one of the spiders 49 of the chart 50, carries the chart 50 through the same angle and a weight indicium on the chart indicative of the weight of the load should now be positioned in registration with an index line 67 which is stretched immediately adjacent the periphery of the chart between two small brackets 68 which are secured by screws 69 (Fig. I) to the casing spiders 35. If, in this operation, after the instrument has been adjusted by a manipulation of the usual adjusting means provided, this indicium is not in registration with the index line it is obvious that this error is due to a cause which is not amenable to the adjusting means of the instrument but probably to a slight inaccuracy in the position of the weight indicium on the chart. The operator may then after loosening screw 55 carefully move that clip 54, which is then positioned nearest the open-ended loop 59 on the arm 58 of the chart position adjusting finger 45, towards or away from the center of the cylindrical chart to slightly deform the concentric ring formed by the flexible metallic strip 57, as shown in Fig. II. This deformation of the strip 57 causes the arm 58, which functions as an integral portion of the chart positioning finger 45, to pivot this member about the pintle 44 and through the pin 46, which extends laterally therefrom, impart such slight additional corrective rotation of the chart 50 on the shaft 40 to position the weight indicium in proper registration with the index line 67.

It is obvious that since the flexible strip is coextensive with the periphery of the chart 50 such corrective variation in the chart position may be made throughout the entire indicating capacity of the chart.

Figures IV and V illustrate the invention as applied to a scale having a rotatable disk indicating chart and a fixed index. In this modification, load counterbalancing pendulum mechanism (not shown), which may be of the type described in U. S. Patent 1,543,768, is operatively supported on a frame 33a suitably mounted in the interior of a substantially watchcase-shaped casing 75. In this mechanism means are provided to hold and actuate a rack 66a so that its motion is substantially rectilinear and which is proportional to the weight of a load being weighed. The teeth of this rack mesh with the teeth of a pinion 41a, keyed on a shaft 40a, mounted in antifriction ball bearings 39a which are carried in horizontally extending webs 76 of the frame 33a. To the forwardly extending end of shaft 40a is clamped a sheet metal actuating arm 42a, the outer end of this arm is rebent to form a U-shaped terminal. Extending between the arms formed by the U is a pintle 44a and pivotally mounted upon the pintle 44a is the U-shaped terminal of a chart position adjusting finger 45a. From a point adjacent its other end a pin 46a extends laterally into an elongated slot 47a in a chart 50a which comprises a disk of flat sheet metal which, in the usual manner, is coated upon its face and bears a printed series of weight graduations 78 and designating numerals. This chart is mounted concentrically upon a shoulder of a hollow sleeve 79 and this sleeve is mounted, by means of ball bearings 80 and 81, upon a suitably ground shoulder of the extending portion of the shaft 40a, there being a V-shaped race 82 provided for cooperation with the bearing balls of the bearing 80 to prevent movement longitudinally of the shaft 40a. This construction, as will be seen, permits the chart to be rotated independently of the rotation of the chart shaft 40a.

The casing 75 is provided with an interiorly projecting annular flange 83 having a pad 84 which is adapted to be machined so that its surface lies substantially in the plane of the surface of the chart 50a. A plurality of radially positioned angle clips 54a are fastened, by means of screws 55a, to the machined surface of the flange 83, each of the clips being provided with an elongated slot so that their position may be adjusted.

Perpendicularly extending legs 56a are riveted, or preferably spot welded, to one edge of a strip 57a of flexible material, such as a steel ribbon which, as initially assembled in the scale, is positioned concentrically to the periphery of the chart 50a. The other edge of this flexible strip is straddled by an open-ended loop terminal 59a of a suitably formed arm 58a, preferably made from stiff music wire. This arm is fixedly secured at its center to an end of the chart positioning finger 45a extending to one side of its fulcrum pintle 44a. To the opposite end of this arm a small counterbalancing weight 60a is secured. This counterbalancing weight is adapted to statically balance the arm 58a, the finger 45a and the laterally extending pin 46a about the fulcrum of the assembly, that is the pintle 44a.

The open face of the casing 75 is provided with a suitable cover 85 having an aperture in which is stationed a magnifying lens 86, retained by a frame 87. This opening is so positioned with respect to the housing that an index 67a which is secured to the flange 83, by means of screws 69a, is visible. This index cooperates with the indicia on the chart to indicate the weight of a load on the scale.

The function of this embodiment of the invention is the same as in the previously described example. When upon application of a load of known weight on the scale the chart is revolved and it stops so that the index 67a is not in direct registration with the proper indicium the operator deforms the flexible strip 57a by adjusting that clip 54a which at that time is positioned nearest the open-ended loop 59a of the arm 58a on the chart positioning finger 45a to such an extent that the deformation of the strip 57a through the arm 58a pivots this positioning finger about the pintle 44a in the chart actuating arm 42a until the pin 45a in this finger imparts such corrective movement to the chart on the shaft 40a that the index 67a is in direct registration with the indicium.

The embodiments of the invention herein shown and described are to be regarded as illustrative only, and it is to be understood that the invention is susceptible to variation, modification and change within the spirit and scope of the subjoined claims.

Having described the invention, I claim:

1. In a measuring device, in combination, a casing, a movable member movable in response to change in magnitude of a condition under measurement, a shaft mounted in said casing, a pinion mounted on said shaft and in engagement with said movable member and rotated thereby, a cylindrical chart mounted on said shaft and adapted to rotate independently of the rotation of said shaft, an annular flange in said casing, a deformable member mounted on said flange substantially concentrically to the periphery of said cylindrical chart, means between said deformable member and said annular flange for deforming portions of said deformable member so that such portions become eccentric to the periphery of said cylindrical chart, an articulated arm fixed on said shaft and having sliding engagement with said deformable member and with said cylindrical chart during rotation of said shaft to cause said chart to rotate with said shaft in response to movement of said movable member and independently of the rotation of said shaft to correctively vary the rotation of said chart when said articulated arm engages one of such eccentric portions of said deformable member.

2. In a measuring device, in combination, a casing, a movable member movable in response to change in magnitude of a condition under measurement, a shaft mounted in said casing, a pinion mounted on said shaft and in engagement with said movable member and rotated thereby, a circular disk chart mounted on said shaft and adapted to rotate independently of the rotation of said shaft, an annular flange in said casing positioned substantially in the plane of a surface of said circular disk chart, a deformable member mounted on said flange substantially concentrically to said circular disk chart, means between said deformable member and said annular flange for deforming selected portions of said deformable member so that such portions become eccentric to said circular disk chart, an articulated arm fixed on said shaft and having sliding engagement with said deformable member and with said circular disk chart to cause said chart to rotate with said shaft in response to movement of said movable member and independently of the rotation of said shaft to correctively vary the rotation of said chart when said articulated arm engages one of such eccentric portions of said deformable member.

3. In a measuring device, in combination, a casing, a shaft mounted for rotation within said casing, a circular chart mounted on said shaft for rotation independently of the rotation of said shaft, an annular flange within said casing having a face positioned substantially in the plane of the surface of said circular chart, a flexible strip, a plurality of clips radially secured to said flange and retaining a flexible strip concentric to said chart, means whereby the position of one or more of said plurality of clips may be shifted on said flange to cause portions of said flexible strip to become eccentric to said circular chart, an arm secured to said shaft, a member pivoted on said arm and having relative movement along said flexible strip during rotation of said shaft and acting in response to such eccentric portions of said strip to cause corrective positioning of said chart.

4. In a measuring device, in combination, a casing, a shaft mounted for rotation within said casing, a circular chart mounted on said shaft for rotation independently of the rotation of said shaft, an annular flange within said casing, a flexible strip, a plurality of clips radially secured to said flange and retaining a flexible strip concentric to said chart, means whereby the position of one or more of said plurality of clips may be shifted on said flange to cause portions of said flexible strip to become eccentric to said circular chart, an arm secured to said shaft, a member pivoted on said arm and having relative movement along said flexible strip during rotation of said shaft and acting in response to such eccentric portions of said strip to cause corrective positioning of said chart.

5. In a measuring device, in combination, a shaft, means for rotating said shaft in response to change in magnitude of a condition under measurement, a chart mounted on said shaft for rotation independently of the rotation of said shaft, an arm secured to said shaft, a curvilinear flexible strip mounted concentrically to said rotatable chart, means for causing selected portions of said curvilinear flexible strip to become eccentric to said chart, a finger pivoted on said arm and engaging said chart for causing said chart to partake of the rotation of said shaft, said finger being in engagement with said curvilinear flexible strip during rotation of said shaft, whereby corrective variation is imparted to the rotation of said chart when said finger engages one of said eccentric portions of said curvilinear flexible strip.

6. In a measuring device, in combination, a shaft, means for rotating said shaft in response to change in magnitude of a condition under measurement, a chart mounted on said shaft for rotation independently of the rotation of said shaft, means secured to said shaft for causing said chart to partake of its rotation, a curvilinear flexible strip mounted concentrically to said rotatable chart, means for causing portions of said curvilinear flexible strip to become eccentric to said chart and means pivoted to said means secured to said shaft for causing said chart to partake of its rotation for sensing said eccentric portions of said curvilinear flexible strip to impart corrective variation to such rotation of said chart.

7. In a measuring device, in combination, a shaft, means for rotating said shaft in response to change in magnitude of a condition under measurement, a chart mounted on said shaft for rotation independently of the rotation of said shaft, means connecting said shaft to said chart for causing said chart to partake of said shaft's rotation and means including a curvilinear flexible strip engaged with said connecting means whereby corrective variation is imparted to such rotation of said chart and means for flexing said flexible strip for adjusting such corrective variation.

LAWRENCE S. WILLIAMS.